United States Patent Office 3,468,907
Patented Sept. 23, 1969

3,468,907
GLYCERYL ESTERS OF α-(1-AROYL-3-INDOLYL)ALKANOIC ACIDS
Margaret H. Sherlock, Bloomfield, N.J., assignor to Schering Corporation, Bloomfield, N.J., a corporation of New Jersey
No Drawing. Filed Apr. 10, 1967, Ser. No. 629,363
Int. Cl. C07d 27/56; A61k 27/00
U.S. Cl. 260—326.12                9 Claims

ABSTRACT OF THE DISCLOSURE

The invention relates to glyceryl esters of α-(1-aroyl-3-indolyl)alkanoic acids, to their use as analgesic anti-inflammatory agents, and to the intermediates useful in the preparation thereof. Illustrative of the preparation of the compounds of this invention is the formation of glyceryl - α - (5-methoxy-1-p-chlorobenzoyl-2-methyl-3-indolyl)acetate, as follows: Heat a mixture of cyanomethyl-5-methoxy-2-methyl-3-indolylacetate and 2,2-dimethyl-1,3-dioxolane-4-methanol for 30 minutes. Convert the so-prepared β,γ-isopropylidenedioxypropyl-5-methoxyl-2-methyl-3-indolylacetate to its sodium salt with sodium hydride in an anhydrous solvent and the sodium salt is acylated by stirring with p-chlorobenzoyl chloride at room temperature for 16 hours. Hydrolyze the β,γ-isopropylidenedioxypropyl - α - (5-methoxy-1-p-chlorobenzoyl-2-methyl-3-indolyl)acetate by heating the ester on a steam bath, in the presence of 75% acetic acid, for 15 minutes. Alternate methods for the preparation of the glyceryl esters of the α-(1-aroyl-3-indolyl)alkanoic acids are also described.

FIELD OF INVENTION

This invention relates to compositions of matter identifiable in the art of chemistry as glyceryl esters of α-(3-indolyl)-lower alkanoic acids, to the processes and intermediates useful for the preparation thereof, and to the therapeutic use of such compositions.

SUMMARY OF THE INVENTION

The invention sought to be patented in one of its composition of matter aspects is described as residing in the concept of a chemical compound having the molecular structure of a glyceryl ester of an α-(1-aroyl-3-indolyl)alkanoic acid. In another composition aspect, the invention relates to β,γ-alkylidenedioxypropyl esters of α-(1-aroyl-3-indolyl)alkanoic acids and of α-(3-indolyl) alkanoic acids.

The invention sought to be patented in another of its composition aspects resides in the concept of pharmaceutical dosage forms containing a novel compound of this invention.

The invention sought to be patented in one of its process aspects is described as residing in the concept of subjecting a reactive ester of an α-(1-aroyl-3-indolyl)alkanoic acid to an ester interchange reaction which, depending upon the alcohol employed, will either produce the glyceryl ester directly, or will produce an intermediate which, upon hydrolysis, is convertible thereinto. In another of its process aspects this invention relates to the acylation of a β,γ-alkylidenedioxypropyl-α-(3-indolyl)alkanoate to produce an intermediate which, upon hydrolysis, produces a glyceryl-α-(1-aroyl-3-indolyl)alkanoate of this invention. In another process aspect, this invention relates to the process wherein an anhydride of an α-(3-indolyl) alkanoic acid is reacted with glycerol, or a cyclic acetal thereof, to produce a desired compound of this invention, or an intermediate which, upon hydrolysis produces a desired compound of this invention, respectively. In still another process aspect, this invention relates to the process wherein an alkyl isourea is reacted with an α-(3-indolyl) alkanoic acid to form a β,γ-alkylidenedioxypropyl ester of the α-(3-indolyl)alkanoic acid which, upon hydrolysis produces the desired compound of this invention.

The invention sought to be patented in its method-of-use aspect is described as residing in the concept of treating and alleviating inflammation and inflammatory conditions by administering a therapeutically effective quantity of a novel compound of this invention. Another aspect is that wherein a novel compound of this invention is used to cause an analgesic effect. Still another use aspect is that wherein a novel compound of this invention is used to cause an antipyretic effect. Another use aspect of this invention is the use of compositions which, in addition to the novel compounds of this invention, contain other active ingredients to provide desirable complementary effects when employed in the treatment of inflammatory conditions and in the treatment of pain.

DESCRIPTION OF THE PREFERRED EMBODIMENTS

A more specific representation of the glyceryl esters of the α-(3-indolyl) alkanoic acids tangible embodiments of this invention are the chemical compositions of matter having the structural formula:

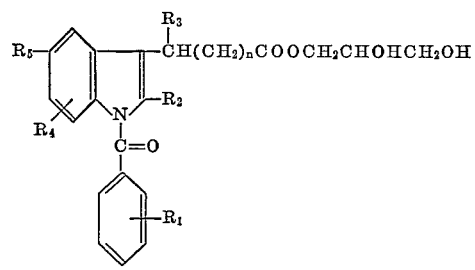

I wherein $R_1$ is a member of the group consisting of hydrogen, halogeno, lower alkyl, trifluoromethyl, and -S-lower alkyl, $R_2$ is a member of the group consisting of hydrogen and lower alkyl, $R_3$ is a member of the group consisting of hydrogen and lower alkyl, $R_4$ is a member of the group consisting of hydrogen, lower alkoxy, halogeno, lower alkyl, and nitro, and $R_5$ is a member of the group consisting of hydrogen, lower alkoxy, lower alkyl, trifluoromethyl, and diloweralkylamino and $n$ is 0, 1, 2 or 3.

In the most preferred compounds of the invention, $R_5$ is preferentially methoxy, although compounds are advantageously suitable for therapeutic application wherein $R_5$ is lower alkyl, lower alkoxy, nitro, amino, or substituted amino. Examples of the alkyl and alkoxys are methyl, ethyl, propyl, t-butyl, methoxy, ethoxy, i-propoxy and the like. The preferred $R_2$ substituent is methyl, and the preferred $R_1$ substituents are p-chloro and p-methyl. Also it is preferred that the aliphatic acid moiety be acetic acid although propionic, butyric, valeric and like acids are embraced herein. Thus, when the process of making the embodiments of this invention is described it is understood that although the description may be specifically directed to acetic acid derivatives, such other aliphatic acids are also embraced therein.

The desired glyceryl esters of this invention (I) may be prepared from any one of several different routes of synthesis, the choice being determined by the ready-availability of the required starting materials. One method of synthesis is by the hydrolysis of an alkylidenedioxypropyl ester of an α-(1-aroyl-3-indolyl)alkanoic acid (VII), said ester being formed by the transesterification of a reactive ester of an α-(3-indolyl)alkanoic acid (IV) with a cyclic acetal of glycerol (V). The transesterification reaction is generally effected by heating the reactive ester of the appropriately substituted α(3-indolyl)alkanoic acid with the cyclic acetal of glycerol in the presence of catalytic amounts of an anhydrous alkaline catalyst, such as potassium carbonate, at temperatures in the range of 80°–250° C., although it is preferred to heat the reaction mixture at about 100° C. As the ester interchange is reversible, it is preferred to employ large excess quantities of the cyclic acetal. The reaction may also be effected in high boiling reaction-inert solvents. The hydrolysis of the β,γ-alkylidenedioxypropyl esters may be effected by standard and well known techniques. The hydrolysis of the esters should be such that the 1-position aroyl substituent is not also hydrolyzed. Representative of suitable techniques for the selective hydrolysis of the alkylidenedioxypropyl ester are: Reaction with catalytic amounts of an aryl sulfonic acid, such as p-toluenesulfonic acid, at room temperature; hydrolysis of the ester in dioxane at room temperature for 3 hours; hydrolysis in sodium acetate with acetic acid at 80° C. for up to ½ hour, and the like.

In practice, it is preferred to employ cyanomethyl esters of the α-(3-indolyl)alkanoic acids, although other equivalently functioning esters may also be employed. Among such equivalently functioning esters are acyl, carbamyl, acyloxy, carbalkoxy and the like reactive esters readily amenable to ester interchange with either the cyclic acetals of glycerol or glycerol itself.

The α,γ - alkylidenedioxypropyl-α-(1-aroyl-3-indolyl)alkanoates (VII) are synthesized by acylation of the β,γ - alkylidenedioxypropyl-α-(3-indolyl)alkanoate (VI) having the desired $R_2$, $R_4$ and $R_5$ substitutents, ($R_2$, $R_4$ and $R_5$ being as previously defined). The acylation reaction is preferably conducted by treating the β,γ-alkylidenedioxypropyl-α-(3-indolyl)alkanoate with an alkali metal hydride such as sodium hydride, under a nitrogen atmosphere, to form e.g., a sodium salt and then intimately contacting said salt with an aroyl acid halide (e.g. p-chlorobenzoyl chloride) in an anhydrous solvent medium. It is preferred to employ solvents such as dimethylformamide, benzene, toluene or xylene. The acylation is carried out at about room temperature, although lower temperatures may be employed if the reactants are readily susceptible to decomposition. Other alternative methods of acylation well known to the art may also be used.

The intermediary reactive esters (IV) may be prepared by standard techniques such as by reaction of the appropriate α-(3-indolyl)alkanoic acid (III) with chloroacetonitrile (or other equivalently functioning compounds) by heating the reactants at about 60°–100° C. in the presence of triethylamine.

The foregoing reaction scheme may be depicted as follows:

Reaction Scheme A:

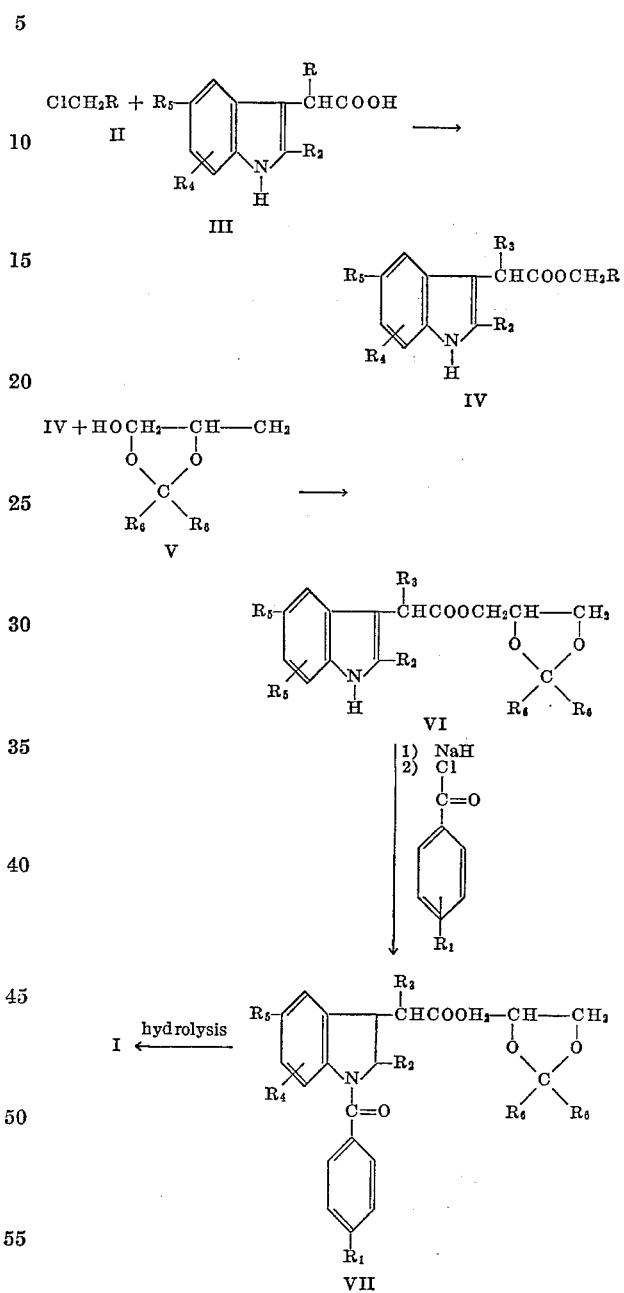

wherein $R_1$, $R_2$, $R_3$, $R_4$, and $R_5$ are as previously defined, R represents cyano, acyl, acyloxy, carbalkoxy and the like, and $R_6$ represents lower alkyl or other equivalently functioning radicals. Representative of those compounds embraced by Formula II are chloroacetonitrile, chloroacetone, α-chloroacetamide, chloroaceptophenone and ethylchloroacetate, respectively. A preferred cyclic acetal of glycerol (V) is 2,2-dimethyl-1,3-dioxolane-4-methanol.

Alternatively the desired products (I) may be prepared by transesterifying the reactive esters of α-(1-aroyl-3-indolyl)alkanoic acids (VIII) with glycerol or with a cyclic acetal of glycerol (V) to yield a compound of Formula VII which, upon hydrolysis, yields the desired compounds.

Alternatively, another method for the preparation of the desired compounds of this invention is the process wherein, in the presence of pyridine, an appropriate carbodiimide is reacted with an α-(laroyl-3-indolyl)alkanoic acid to form an isoureayl-α(1-aroyl-3-indolyl)alkanoate (IX), which ester is then reacted with glycerol to produce the desired compounds (I), or else they are reacted with a cyclic acetal of glycerol (V) to form a β,γ-alkylidenedioxypropyl-α-(1-aroyl-3-indolyl) alkanoate (VII) which, upon hydrolysis, produces the desired compounds. In effecting the formation of the isoureayl-α(1-aroyl-3-indolyl)alkanoate, equimolar quantities of the reactants are heated (preferably at about reflux temperatures) using pyridine as a base solvent, although other equivalently functioning bases may also be used. It is preferred to employ N,N'-dicyclohexylcarbodiimide, although other equivalently functioning carbodiimides may be similarly employed. The ester interchange reaction of the so-formed isoureayl-α-(1-aroyl-3-indolyl)alkanoate with glycerol, or cyclic acetal thereof, is effected according to standard techniques well known in the art.

The foregoing reaction scheme may be depicted as follows:

*Reaction Scheme B:*

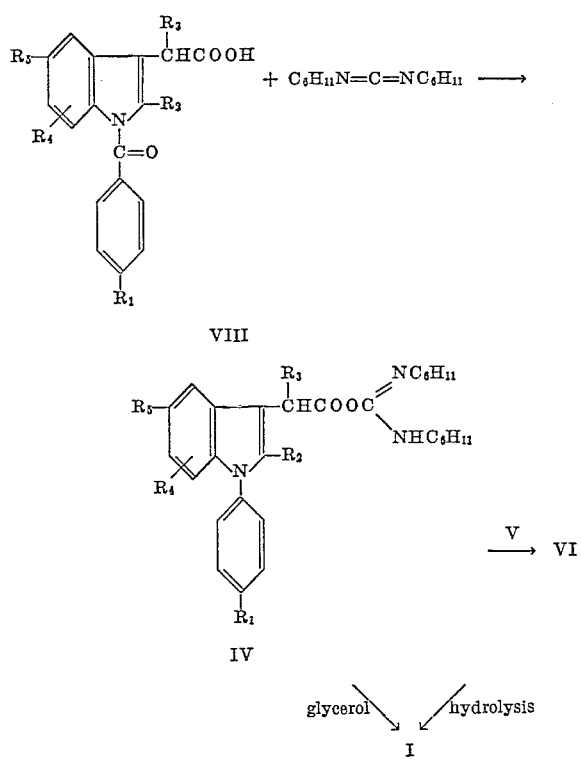

Alternatively, the β,γ-alkylidenedioxypropyl-α-(1-aroyl-3-indolyl)alkanoates (VII) may also be prepared by reacting the appropriate cyclic acetal (V) with an α-(1-aroyl-3-indolyl)alkanoic acid anhydride wherein one-half molar proportions of the anhydride is caused to react with the cyclic acetal of glycerol according to standard procedures such as by heating the reactants in the presence of zinc chloride. Preferably the reaction is conducted in an organic solvent at about the reflux temperature of the reaction mixture. The required acid anhydrides may readily be prepared by intimately contacting two molar proportions of α-(1-aroyl-3-indolyl)alkanoic acids (VIII) with one molar proportion of the carbodiimide and permitting the reaction to occur at room temperature, although it is preferred to have the reaction take place slowly at temperatures below room temperature. In practice N,N'-dicyclohexylcarbodiimide is a convenient reactant suitable for use in this reaction, but other well known equivalently-functioning N,N'-disubstituted carbodiimides may also be employed. Upon completion of the reaction, the urea by-product is removed and the anhydride is ready for use without further purification.

Still another alternate process for the preparation of the alkylidenedioxypropyl esters of the α-(1-aroyl-3-indolyl)alkanoic acids is that process wherein an alkyl isourea is reacted with an α-(1-aroyl-3-indolyl)alkanoic acid. The formation of the intermediate alkyl isourea is readily effected by intimately contacting equimolar quantities of a carbodiimide and a cyclic acetal of glycerol (V) at room temperature in the presence of catalytic quantities of cuprous chloride. In the formation of the O-(β,γ-alkylidenedioxypropyl)isourea it is preferred to employ N,N'-dicyclohexylcarbodiimide but other carbodiimides may similarly be employed. The so-formed O-(β,γ-alklyidenedioxypropyl)isourea is caused to react with an α-(1-aroyl-3-indolyl)-alkanoic acid (VIII) by heating the reactants in the range of about 37°–150° C., said reaction taking place in an inert organic solvent such as dioxane.

Exemplary of the foregoing is that reaction wherein dicyclohexylcarbodiimide is reacted with 2,2-dimethyl-1,3-dioxolane-4-methanol in the presence of cuprous chloride, to form O-(β,γ-isopropylidenedioxypropyl)-N,N'-dicyclohexyl isourea. This so-formed isourea and α-(1-p-chlorobenzoyl-2-methyl-5-methoxy - 3 - indolyl)acetic acid are heated at about 100° C. in dioxane to form β,γ-isopropylidenedioxypropyl)-α-(1-p-chlorobenzoyl-2-methyl-5-methoxy-3-indolyl)acetate, which compound is subsequently hydrolyzed.

Having described the foregoing reactions for the preparation of the desired compounds of this invention (I), it is of course obvious to one skilled in the art that variations may readily be made in these reaction sequences which ultimately produce the same result. For example, instead of forming the anhydride of the fully constituted α-(1-aroyl-3-indolyl)alkanoic acid, it is possible to form the anhydride of an α-(3-indolyl)alkanoic acid and then acylate at the 1-position. Similarly the acyl isourea may be reacted with an α-(3-indolyl)alkanoic acid and the product thereof acylated at the 1-position, and so on. Such variations are the full equivalents of the aforedescribed procedures and as such are embraced within the scope of this invention.

It is of course understood that since the glyceryl esters can exist in the d- and l-forms, the particular d- and l-isomer of the appropriate glycerol reactant may be employed to obtain the desired optical isomer of the glyceryl-α-(1-aroyl-3-indolyl)alkanoate. The required α-(3-indolyl) aliphatic acids may be prepared according to the teachings of U.S. Patent No. 3,161,654.

The following examples are illustrative of the methods of preparation of the compounds of this invention:

Example I.—Glyceryl-α-(1-p-chlorobenzoyl-2-methyl-5-methoxy-3-indolyl)acetate

Step A.—Cyanomethyl-(5-methoxy-2-methyl-3-indolyl) acetate: A mixture of 4.2 g. of 5-methoxy-2-methyl-3-indoleacetic acid, 3 g. of triethylamine, 2.3 g. of chloroacetonitrile and 15 ml. of acetone is stirred and refluxed for two hours. The acetone is allowed to evaporate and 100 ml. of ice water added. The product is filtered, dried and recrystallized from benzenehexane, M.P. 119.5–120.5.

Alternatively, by substituting the chloroacetonitrile reactant with equivalent quantities of chloroacetone, chloroacetamide, phenacylchloride and ethylchloroacetate and by substantially following the procedure of this step of this example, the following compounds are produced: acetonyl-5-methoxy-2-methyl-3-indolyl acetate, carbamylmethyl-5-methoxy-2-methyl-3-indolyl acetate, phenacyl-5-methoxy-2-methyl-3-indolyl acetate, and carbethoxymethyl-5-methoxy-2-methyl-3-indolyl acetate.

Step B.—β,γ - Isopropylidenedioxypropyl(5-methoxy-2-methyl-3-indolyl)acetate: A solution of 6.3 g. of cyanomethyl-(5-methoxy-2-methyl-3-indolyl)acetate in 31 g. of 2,2-dimethyl-1,3-dioxolane 4-methanol in which a small piece of sodium was dissolved, is heated at 125° for 30 minutes. The excess alcohol is removed in vacuo, water added to the residue, oil extracted with ether and the ether extracts dried and concentrated. The product is purified by chromatography on an acid washed alumina column by eluting with ether-petroleum ether (1:1).

Step C.—β,γ-Isopropylidenedioxypropyl-(5-methoxy-1-p-chlorobenzoyl-2-methyl-3-indolyl)acetate: To a stirred solution of 10.4 g. of β,γ-isopropylidenedioxypropyl-(5-methoxy-2-methyl-3-indolyl)acetate in 150 ml. of anhydrous dimethylformamide there is added, with cooling, 2.4 g. of sodium hydride (50% dispersion in mineral oil) under an atmosphere of nitrogen, after stirring for 20 minutes, 8.4 g. of p-chlorobenzoyl chloride is added dropwise. The reaction mixture is stirred overnight (16 hours) at room temperature, poured into cold, dilute acetic acid and extracted with ether. The ether extract is washed with dilute sodium bicarbonate solution and water, dried over sodium sulfate and concentrated in vacuo. The product is purified by elution with cyclohexane-benzene (5:1) on a column of acid-washed alumina.

Alternatively, by substituting the p-chlorobenzoyl chloride reactant with equivalent quantities of benzoyl chloride, m-methylbenzoyl chloride, o-chlorobenzoyl chloride, m-chlorobenzoyl chloride, m-trifluoromethylbenzoyl chloride, p-trifluoromethylbenzoyl chloride, o-fluorobenzoyl chloride, m-fluorobenzoyl chloride, p-fluorobenzoyl chloride, o,p-dichlorobenzoyl chloride, p-methylbenzoyl chloride, and by substantially following the procedure of this step of this example there is produced:

β,γ-isopropylidenedioxypropyl(1-benzoyl-5-methoxy-2-methyl-3-indolyl)acetate;
β,γ-isopropylidenedioxypropyl(5-methoxy-2-methyl-1-m-methylbenzoyl-3-indolyl)acetate;
β,γ-isopropylidenedioxypropyl(1-o-chlorobenzoyl-5-methoxy-2-methyl-3-indolyl)acetate;
β,γ-isopropylidenedioxypropyl(1-m-chlorobenzoyl-5-methoxy-2-methyl-3-indolyl)acetate;
β,γ-isopropylidenedioxypropyl(5-methoxy-2-methyl-1-m-trifluoromethylbenzoyl-3-indolyl)acetate;
β,γ-isopropylidenedioxypropyl(5-methoxy-2-methyl-1-p-trifluoromethylbenzoyl-3-indolyl)acetate;
β,γ-isopropylidenedioxypropyl(1-o-fluorobenzoyl-5-methoxy-2-methyl-3-indolylacetate;
β,γ-(1-m-fluorobenzoyl-5-methoxy-2-methyl-3-indolyl)acetate;
β,γ-(1-p-fluorobenzoyl-5-methoxy-2-methyl-3-indolyl)acetate;
β,γ-(1-o,p-dichlorobenzoyl-5-methoxy-2-methyl-3-indolyl)acetate; and
β-γ-isopropylidenedioxypropyl(5-methoxy-2-methyl-1-p-methylbenzoyl-3-indolyl)acetate, respectively.

Step D.—β,γ - Dihydroxypropyl(5-methoxy-1-p-chlorobenzoyl-2-methyl-3-indolyl)acetate: A solution of 1 g. of β - γ - isopropylidenedioxypropyl(5-methoxy-1-p-chlorobenzoyl-2-methyl-3-indolyl)acetate in 8 ml. of 75% acetic acid is heated on a steam bath for 15 minutes. The solution is poured on ice and water, extracted with ether, the ether extracts washed with dilute sodium bicarbonate solution and water, dried and concentrated in vacuo. The product is purified by chromatography on acid-washed alumina eluting with benzene-chloroform (10:1).

Similarly, by substituting the β,γ-isopropylidenedioxypropyl(5 - methoxy-1-p-chlorobenzoyl-2-methyl-3-indolyl) acetate with those compounds alternatively produced by the procedure of Step C of this example and by substantially following the procedure of this step of this example, there is produced:

glyceryl(1-benzoyl-5-methoxy-2-methyl-3-indolyl)acetate;
glyceryl(5-methoxy-2-methyl-1-m-methylbenzoyl-3-indolyl)acetate;
glyceryl(1-o-chlorobenzoyl-5-methoxy-2-methyl-3-indolyl)acetate;
glyceryl(1-m-chlorobenzoyl-5-methoxy-2-methyl-3-indolyl)acetate;
glyceryl(5-methoxy-2-methyl-1-m-trifluoromethylbenzoyl-3-indolyl)acetate;
glyceryl(5-methoxy-2-methyl-1-p-trifluoromethylbenzoyl-3-indolyl)acetate;
glyceryl(1-o-fluorobenzoyl-5-methoxy-2-methyl-3-indolyl)acetate;
glyceryl(1-m-fluorobenzoyl-5-methoxy-2-methyl-3-indolyl)acetate;
glyceryl(1-p-fluorobenzoyl-5-methoxy-2-methyl-3-indolyl)acetate;
glyceryl(1-o,p-dichlorobenzoyl-5-methoxy-2-methyl-3-indolyl)acetate; and
glyceryl(5-methoxy-2-methyl-1-p-methylbenzoyl-3-indolyl)acetate, respectively.

Similarly, by replacing the 5-methoxy-2-methyl-3-indolyl acetic acid reactant of Step A of this example with equivalent quantities of 5-methoxy-2-methyl-3-indolyl-α-propionic acid; 5-methoxy-2-methyl-3-indolyl-β-propionic acid; 5-methoxy-2-methyl-3-indolyl-butyric acid; 5-methoxy-2-methyl-3-indolyl-valeric acid, and by substantially following the procedure of Step A of this example there is produced: cyanomethyl(5-methoxy-2-methyl-3-indolyl)-α-propionate; cyanomethyl(5-methoxy-2-methyl 3 - indolyl) - β - propionate; cyanomethyl(5-methoxy-2-methyl-3-indolyl)-propionate; cyanomethyl(5-methoxy-2-methyl-3-indolyl)-valerate, and by carrying out the procedures of Steps B, C and D of this example with the foregoing and the appropriate products obtained respectively, there is produced: glyceryl(5-methoxy-1-p-chlorobenzoyl 2 - methyl-3-indolyl)-α-propionate; glyceryl(5-methoxy-1-p - chlorobenzoyl - 3-indolyl)-β-propionate; glyceryl(5-methoxy - 1 - p-chlorobenzoyl-2-methyl-3-indolyl)butyric acid, and glyceryl(5-methoxy-1-p-chlorobenzoyl-2-methyl-3-indolyl)valerate, respectively.

Similarly, by replacing the 5-methoxy-2-methyl-3-indoyly-acetic acid reactant of Step A with 5-methoxy-2,4-dimethyl-3-indolyl-acetic acid;
5-methoxy-6-methyl-3-indolyl-acetic acid;
2methyl-5-trifluoromethyl-3-indolyl-acetic acid;
2,5-dimethyl-3-indolyl-acetic acid;
2-methyl-3-indolyl-acetic acid;
2,4-dimethyl-5-trifluoromethyl-3-indolyl-acetic acid;
4-chloro-5-methoxy-2-methyl-3-indolyl-acetic acid;
2-methyl-3-indolyl-acetic acid;
4,5-di-methoxy-2-methyl-3-indolyl-acetic acid;
5-methoxy-2-methyl-6-nitro-3-indolyl-acetic acid, and by substantially following the procedures of Steps A, B, C and D of this example, there is produced:
glyceryl-α-(5-methoxy-2,4-dimethyl-1-p-chlorobenzoyl-3-indolyl)acetate;
glyceryl-α-(5-methoxy-6-methyl-1-p-chlorobenzoyl-3-indolyl)acetate;
glyceryl-α-(2-methyl-1-p-chlorobenzoyl-5-trifluoromethyl-3-indolyl)acetate;
glyceryl-α-(1-p-chlorobenzoyl-2,5-dimethyl-3-indolyl)acetate;
glyceryl-α-(1-p-chlorobenzoyl-2-methyl-3-indolyl)acetate;
glyceryl-α-(1-p-chlorobenzoyl-2,4-dimethyl-5-trifluoromethyl-3-indolyl)acetate;
glyceryl-α-(4-chloro-5-methoxy-1-p-chlorobenzoyl-2-methyl-3-indolyl)acetate;
glyceryl-α-(1-p-chlorobenzoyl-2-methyl-3-indolyl)acetate;
glyceryl-α-(1-p-chlorobenzoyl-5-methoxy-3-indolyl)acetate;

glyceryl-α-(4,5-di-methoxy-2-methyl-1-p-chlorobenzoyl-3-indolyl)acetate, and glyceryl-α-(5-methoxy-2-methyl-6-nitro-1-p-chlorobenzoyl-3-indolyl)acetate, respectively.

Example 2.—Glyceryl-α-(1-p-chlorobenzoyl-2-methyl-3-indolyl)acetate

Step A: β-γ-Isopropylidenedioxypropyl-α-(1-p-chlorobenzoyl-5-methoxy-2-methyl-3-indolyl)acetate: To a cold solution of 1.0 g. of α-(1-p-chlorobenzoyl-2-methyl-5-methoxy-3-indolyl)acetic acid in 3 ml. of anhydrous pyridine, add with shaking, 600 mg. of dicyclohexylcarbodiimide and to the resulting cold solution add 740 mg. of 2,2-dimethyl-4-hydroxymethyl-1,3-dioxolane and stir the resulting reaction mixture for 16 hours at 0–4° C. Dilute the resulting mixture with 15 ml. of ether, filter off the colorless dicyclohexyl urea and successively wash the etheral filtrate with 5% acetic acid, water, dilute sodium bicarbonate solution, water and then dry the so-obtained β,γ-isopropylidenedioxypropyl-α-(1 - p - chlorobenzoyl-5-methoxy-2-methyl-3-indolyl)acetate as a viscous yellow oil.

Step B.—Glyceryl-α-(1-p-chlorobenzoyl-2-methyl-3-indolyl)acetate: Heat a solution of 1.2 g. of β,γ-isopropylidenedioxypropyl - α - (1 - p - chlorobenzoyl-5-methoxy-2-methyl-3-indolyl)acetate in 10 ml. of 75% acetic acid on a steam bath for ½ hour. Pour the resulting yellow solution onto ice water and extract the resulting mixture with ether, and successively wash the ethereal layer with water, dilute sodium bicarbonate solution and water. Dry the ether layer, concentrate to a residue and crystallize the glyceryl-α-(1-p-chlorobenzoyl-2-methyl-3-indolyl)acetate from ethanol-water.

The tangible embodiments of this invention possess the inherent applied use characteristics of exerting an anti-inflammatory response as determined by pharmacological evaluation, and also exert analgesic and anti-pyretic actions. Thus, they are useful in treating inflammation and in treating certain symptoms of pain.

The treatment of inflammation with concomitant absence of side effects induced by the anti-inflammatory agent has been a goal, long-sought. Until recently, steroids having cortisone-like activity had been employed for the treatment of inflammation. However, the use of steroids had the drawback of exhibiting side effects such as electrolyte imbalance, water retention and the like. Recently certain α-(1-aroyl-3-indolyl)alkanoic acids have been discovered to be effective anti-inflammatory agents, said agents being rather specific in their action as well as being free from the side effects due to steroid therapy. However, it has also been found that these α-(1-aroyl-3-indolyl)alkanoic acid anti-inflammatory agents exhibit deleterious side effects such as for example, ulceration of the gastrointestinal tract, as well as possessing an extremely bitter taste upon oral administration. Thus, although these α-(1-aroyl-3-indolyl)alkanoic acids represented an improvement over steroid therapy, they themselves were not free from undesirable attributes. In an attempt to overcome some of the drawbacks to the use of these α-(1-aroyl-3-indolyl)alkanoic acids, the usual salts, esters and other derivatives were made. These derivatives however did not effectively eliminate the drawbacks; indeed, in most instances they proved to be less potent in their anti-inflammatory, anti-pyretic and analgesic effects without eliminating the undesirable side effects.

By the employment of standard laboratory techniques it is to be found that, compared to its corresponding α-(1-aroyl-3-indolyl)alkanoic acids, the glyceryl-α-(1-aroyl-3-indolyl)alkanoate of this invention have exhibited a marked lessening of the ulcerogenic effect upon the gastrointestinal tract and at the same time they have not exhibited significant decreases in their anti-inflammatory or anti-pyretic effects, nor has the glycerylation lowered the effectiveness of the compounds in their analgesic effects. In practice, based upon standard pharmacological animal studies, particularly in the rat, it has been found that chronic administration of daily doses of 1–200 mg. of the compounds of this invention per kg. of animal body weight will elicit the desired anti-inflammatory-analgesic effect without producing significant ulcerogenic effects, and that short term administration for acute conditions, the daily dosage is in the range of about 0.5–600 mg./kg. of animal body weight. As expected, it is also to be found that in the treatment of larger animals, such as the dog, the daily dosage is about 0.5–200 mg. per kg. of body weight, whereas with still larger animals, such as those mammals having an adult body weight of about 70 kg., the daily oral dosage is about 0.5–300 mg. per kg. of body weight. Of course, in all instances the optimum daily dosage level useful in the control of arthritic and other herein described conditions will vary depending upon the activity of the specific compound and the severity of the condition being treated, and the reaction sensitivity of the patient. It is also to be found that significantly smaller doses may be administered when it is desired to effect only analgesic effects. Thus, the compounds of this invention have significantly enhanced the functional-use indices of the α-(1-aroyl-3-indolyl)alkanoic acid class of compounds in the treatment of pain and inflammatory conditions. It is also to be noted that the glyceryl esters of this invention have also significantly increased the water solubility characteristics over that of the prior art compounds and at the same time have unexpectedly lessened the bitter taste characteristic. Thus, the glyceryl-α-(1-aroyl-3-indolyl)alkanoates of this invention are useful in treating pain and inflammation, especially that associated with rheumatoid and osteoporoses joint disease, collagen diseases, bursitis, gouty arthritis, spondylitis and the like.

As is true for most classes of therapeutically useful compounds, certain sub-classes and certain specific compounds are found to be more effective than other members of the general class. Of the glyceryl-α-(1-aroyl-3-indolyl)alkanoates, it is found that those compounds having a 1-p-halogenobenzoyl moiety, particularly the 1-p-chlorobenzoyl moiety, offer more advantageous properties than do the general class of substituents for that position, it is also found that those compounds having a methoxy radical in the 5-position and a methyl radical in the 2-position of the indolyl moiety are particularly useful compounds. Also those compounds having an p-alkylthio-benzoyl radical in the 1-position offer advantageous properties. Particularly useful compounds are α-(1-p-methylthiobenzoyl - 2 - methyl - 5 - methoxy-3-indolyl)propionic acid, α-(1-p-chlorobenzoyl-2-methyl-5-methoxy - 3 - indolyl)propionic acid, (1-p-chlorobenzoyl - 2 - methyl-5-methoxy-3-indolyl)acetic acid, α - (1-p-chlorobenzoyl-2-methyl-5-dimethylamino-3-indolyl)propionic acid and (1-p-chlorobenzoyl-2-methyl-5-dimethylamino - 3 - indolyl) acetic acid.

It has been found that the alkylidenedioxypropyl-α-(1-aroyl-3-indolyl)alkanoate intermediates (i.e., those embraced by Formula VII) also exhibit significant anti-inflammatory-analgesic effects and therefore, although of somewhat less potency than their hydrolysis products, they are therapeutically useful in the treatment of pain and inflammation, as well as being useful as chemical intermediates.

The therapeutic compositions of matter described herein may be administered parenterally or enterally. Preferably, the compounds are orally administered, said oral administration of the glyceryl-α-(1-aroyl-3-indolyl)alkanoates being best effected by incorporating them into dosage forms such as tablets, capsules, elixirs, solutions, suspensions and the like. Representative embodiments of the formulations containing the compositions of this invention are as follows:

Tablet formulations

I. Formula and method of manufacture for glyceryl-α-(1-p-chlorobenzoyl-2-methyl-5-methoxy-3-indolyl)acetate. Enteric coated tablets:

Formula

| | Mg./core |
|---|---|
| Glyceryl-α-(1-p-chlorobenzoyl-2-methyl-5-methoxy-3-indolyl)acetate, micronized | 100.0 |
| Citric acid | 1.0 |
| Lactose, USP | 33.5 |
| Dicalcium phosphate | 70.0 |
| Pluronic F-68 | 30.0 |
| Sodium lauryl sulfate | 15.0 |
| Polyvinylpyrrolidone | 15.0 |
| Carbowax 1500 | 4.5 |
| Carbowax 6000 | 45.0 |
| 3A alcohol, 50 ml./1000 cores. | |
| Corn starch | 30.0 |

Dry

| | |
|---|---|
| Sodium lauryl sulfate | 3.0 |
| Magnesium stearate | 3.0 |
| Tablet weight | 350.0 |

*Procedure.*—The glyceryl-α-(1-p-chlorobenzoyl-2-methyl-5-methoxy-3-indolyl)acetate is mixed with the citric acid, lactose, dicalcium phosphate, pluronic and sodium lauryl sulfate. The above mixture is screened through a No. 60 screen and granulated with an alcoholic solution consisting of polyvinylpyrrolidone, carbowax 1500 and 6000. Add additional alcohol, if necessary, to bring powders to a pasty mass. Add corn starch and continue mixing until uniform granules are formed. Pass through a No. 10 screen, tray and dry in oven at 100° C. for 12–14 hours. Reduce dried granulation through a No. 16 screen add sodium lauryl sulfate and magnesium sulfate, mix and compress into desired shape on a tablet machine.

Pluronic F-68 is a U.S. registered trademark for a nonionic surface-active agent prepared by the addition of ethylene oxide to a polypropylene glycol which has a molecular weight of 1750.

*Coating.*—The above cores are treated with a lacquer and dusted with talc to prevent moisture adsorption. Subcoat layers are added to round out the core. A sufficient number of lacquer coats are applied to make the core enteric. Additional subcoats and smoothing coats are applied to completely round out and smooth the tablet. Color coats are applied until desired shade is obtained. After drying the coated tablets are polished to give the tablets an even gloss.

II. Capsule formulations:

Formula

| | Mg./capsule |
|---|---|
| Glyceryl-α-(1-p-chlorobenzoyl-4-methyl-5-methoxy-3-indolyl)acetate, micronized | 100.00 |
| Citric acid | 1.00 |
| Pluronic F-68 | 40.00 |
| Sodium lauryl sulfate | 20.00 |
| Lactose | 238.00 |
| Magnesium stearate | 101.00 |
| | 400.00 |

*Procedure.*—Mix together glyceryl-α-(1-p-chlorobenzoyl-2-methyl-5-methoxy-3-indolyl)acetate, citric acid, pluronic, sodium lauryl sulfate and lactose. Pass through a No. 80 screen. Add magnesium stearate, mix and encapsulate into the proper size 2-gelatin capsule.

III. Oral suspension:

Formula

| | mg./5 ml. |
|---|---|
| Glyceryl-α-(1-p-chlorobenzoyl-2-methyl-5-methoxy-3-indolyl)acetate micronized | 100.0 |
| Veegum, Vanderbilt | 50.0 |
| Standard granulated sugar, USP | 2500.0 |
| Sorbitol solution, USP | 1250.0 |
| Sodium saccharin, NF | 50.0 |
| Sodium benzoate, USP | 5.0 |
| Ethanol, USP, 0.025 ml. | |
| Menthol, USP | 1.000 |
| Flavor, q.s. | |
| Purified water, USP, to make 5 ml. | |

*Method of preparation.*—Dissolve the sodium saccharin, sodium benzoate, standard granulated sugar and sorbitol solution in approximately 80% of the required amount of water. Disperse the Veegum in approximately 5% of the required amount of water and add the dispersion to the previously prepared syrup. Prepare a slurry of the glyceryl-α-(1-p-chlorobenzoyl-2-methyl-5-methoxy-3-indolyl)acetate with approximately 10% of the required amount of water and pass through a suitable colloid mill until free of grittiness. Add the milled active slurry to the batch. Dissolve the menthol and flavor in the alcohol and add the resulting solution to the batch. Add sufficient purified water to bring the batch to total volume. Agitate until uniform.

IV. Suppository:

Formula:

Glyceryl-α-(1-p-chlorobenzoyl-2-methyl-5-methoxy-3-indolyl)acetate, micronized 100 mg./2 mgs.
Theobroma oil, pharm. grade to make 2 gms.

*Method of preparation.*—Prepare a slurry of the glyceryl-α-(1-p-chlorobenzoyl-2-methyl-5-methoxy-3-indolyl)acetate with a portion of the melted theobroma oil and pass the slurry through a suitable colloid mill until it is free of grittiness. Add sufficient melted theobroma oil to bring the batch to final weight. Pour the melted mix, while maintaining uniformity, into appropriately prepared molds and allow to cool.

V. Topical ointment:

| | mg./gm. |
|---|---|
| Glyceryl-α-(1-p-chlorobenzoyl-2-methyl-5-methoxy-3-indolyl)acetate, micronized | 20.0 |
| Methylparaben, USP | 0.5 |
| Propylparaben, USP | 0.1 |
| Petrolatum, USP, to make 1 gm. | |

*Method of manufacture.*—Dissolve the parabens in the melted petrolatum. Prepare a slurry of the glyceryl-α-(1-p-chlorobenzoyl-2-methyl-5-methoxy-3-indolyl)acetate with a portion of the paraben solution. Pass the slurry through a suitable colloid mill until free of grittiness. Add the slurry to the remainder of the paraben solution and mix while cooling to room temperature.

Another part of the inventive aspects of this invention is the glyceryl esters of (1-aroyl-3-indolinyl)alkanoic acids, said acids having the structural formula:

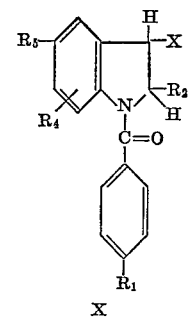

X wherein $R_1$ is a member of the group consisting of hydrogen, halogeno, lower alkyl-S-alkyl and trifluoromethyl, preferably chloro, $R_2$ is a member of the group consisting of hydrogen and lower alkyl, preferably methyl, $R_4$ is a member of the group consisting of hydrogen, lower alkoxy, halogen, lower alkyl and nitro, preferably hydrogen, $R_5$ is a member of the group consisting of hydrogen, lower alkoxy, dilower alkylamino lower alkyl and trifluoromethyl, preferably methoxy, X is a member of the group consisting of α-propionic acid, β-propionic acid, preferably acetic acid.

Expressed another way, X may represent such substituents as $-CH_2-CH_2COOCH_2CHOHCH_2OH$,

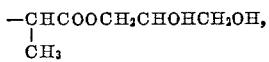

and $-CH_2-COOCH_2CHOHCH_2OH$.

The foregoing glyceryl esters of 1-aroyl-3-indolinylalkanoic acids are extremely useful as anti-inflammatory-analgesic agents useful in the treatment of inflammation and fever due to inflammation in patients, by the oral administration of therapeutically effective doses of such compounds. Such compounds exhibit less ulcerogenic side effects than their corresponding free acids without significantly altering their effectiveness as anti-inflammatory-analgesic properties characteristics. As determined by pharmacological evaluation, such as by employment of the Carrogeenin paw test in the rat, such compounds maintain their minimum potency values of about ½ to ¾ that of the corresponding free acid, but yet significantly reduce the ulcerogenic characteristic.

The compounds of Formula X may be prepared by subjecting a reactive ester of an α-(1 - aroyl-3-indolinyl)alkanoic acid to an ester interchange reaction which, depending upon the alcohol employed (glycerol or a cyclic acetal of glycerol), will either produce the glyceryl ester directly, or will produce an intermediate which, upon hydrolysis, is convertible thereinto. Another process for preparing compounds of Formula X is the acylation of a β,γ-alkylidenedioxypropyl-α-(3-indolinyl)alkanoate to produce an intermediate which, upon hydrolysis, produces a glyceryl-α-(1-aroyl-3-indolinyl)alkanoate of Formula X. Another process for preparing compounds of Formula X is the reaction of an anhydride of an α-(3-indolinyl)alkanoic acid with glycerol, or a cylic acetal thereof, to produce a compound of Formula X, or an intermediate which, upon hydrolysis, produces the desired compound. Another process for preparing compounds of Formula X is that process wherein an acyl isourea is reacted with an α-(3-indolinyl)alkanoic acid to form a β,γ-alkylidenedioxypropyl ester of the α-(3-indolinyl)alkanoic acid which, upon hydrolysis produces the desired compound. In effecting the foregoing procedures for preparing the compounds of Formula X, the hereinabove described details of such reactions, as described for the preparation of compounds of Formula I, are, of course, applicable. It is also found that the alkylidenedioxypropyl esters of Formula X also exhibit anti-inflammatory-analgesic activity.

In brief, one method for the preparation of the compounds of Formula X may be structurally depicted as follows:

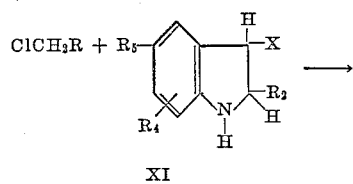

XI

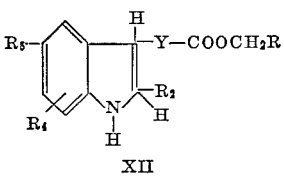

XII

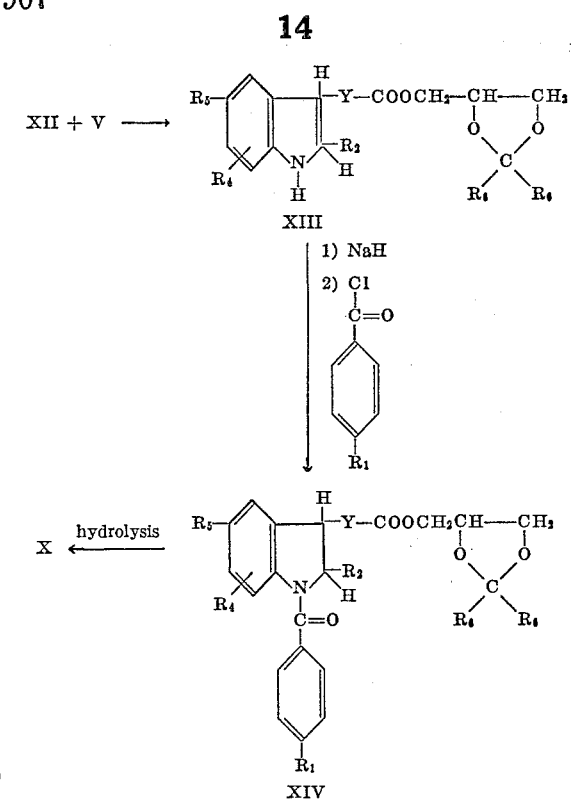

wherein said X and R substituents are as previously defined and Y is a member of the group consisting of

$-CH_2-$, and $-CH_2CH_2-$. Of course, the foregoing reactions, as further described for the preparation of compounds of Formula I, may be prepared from the fully constituted 1-aroyl-3-indolinylalkanoic acid.

Particularly useful compounds of the foregoing are those wherein $R_1$ represents p-chloro, $R_2$ represents methyl and $R_5$ represents methoxy. Particularly useful are the compounds glyceryl-α-(1 - p-chlorobenzoyl - 2-methyl-5-methoxy-3 - indolinyl) propionate and glyceryl-α-(1-p-chlorobenzoyl - 2-methyl-5-methoxy-3-indolinyl)acetate. The intermediate esters of Formula XIV also exhibit analgesic anti-inflammatory properties.

Still another aspect of this invention is the glyceryl esters of α-(1-aroyl-aza-3-indolyl)alkanoic acids having the structural formula:

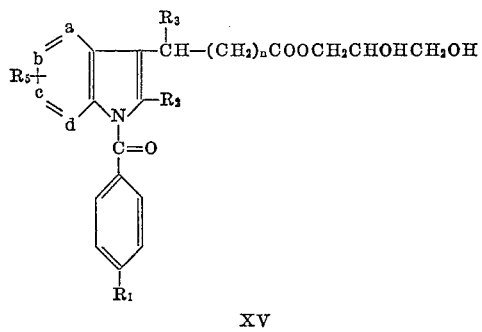

XV wherein *a*, *b*, *c*, and *d* are each selected from the group consisting of carbon and nitrogen, only one of said *a*, *b*, *c* and *d* being nitrogen at any one time, $R_1$ is a member of the group consisting of hydrogen, halogeno, lower alkyl, trifluoromethyl, and -S-loweralkyl, $R_2$ is a member of the group consisting of hydrogen and lower alkyl, $R_3$ is a member of the group consisting of hydrogen and lower alkyl, $R_4$ is a member of the group consisting of hydrogen, lower alkoxy, halogeno, lower alkyl, and nitro, and $R_5$ is a member of the group consisting of hydrogen, lower alkyl, lower alkyl, trifluoromethyl and diloweralkylamino and $n$ is 0, 1, 2 or 3.

The foregoing glyceryl esters of (1-aroyl-aza-3-indolyl)-alkanoic acids (XV) are extremely useful as anti-inflammatory-analgesic agents useful in the treatment of inflammation and fever due to inflammation in patients, by the oral administration of therapeutically effective doses of such compounds. Such compounds exhibit less ulcerogenic side effects than their corresponding free acids without significantly altering their effectiveness as anti-inflammatory-analgesic properties characteristics. As determined by pharmacological evaluation, such as by employment of the Carrogeenin paw test in the rat, such compounds maintain their minimum potency values of about ½ to ¾ that of the corresponding free acid, but yet significantly reduce the ulcerogenic characteristic. Of particular interest are those glyceryl-α-(1-aroyl-7-aza-3-indolyl)acetates of the formula:

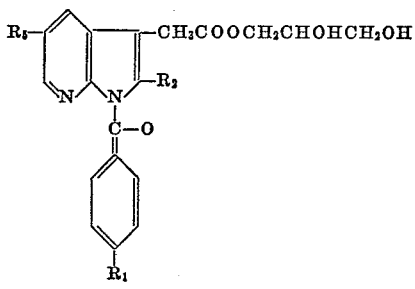

XVI wherein $R_1$, $R_2$ and $R_5$ are as previously defined for Formula XV. Specific compounds of particular interest are glyceryl - α - (1-p-chlorobenzoyl-2-methyl-5-methoxy-7-aza-3-indolyl)-acetate, and glyceryl-α-(1-pmethylthiobenzoyl-2-methyl-5-dimethylamino-7-aza - 3 - indolyl) acetate.

The compounds of Formula XV may be prepared by subjecting a reactive ester of an α-(1-aroyl-aza-3-indolyl) alkanoic acid to an ester interchange reaction which, depending upon the alcohol employed (glycerol or a cyclic acetal of glyceryl), will either produce the glyceryl ester directly, or will produce and β,γ-alkylidenedioxypropyl ester intermediate which, upon hydrolysis, is convertible thereinto. Another process for preparing compounds of Formula XV is the acylation of a β,γ-alkylidenedioxypropyl-α-(aza-3-indolyl)alkanoate to produce an intermediate which, upon hydrolysis, produces a glyceryl-α-(1-aroyl-aza-3-indolyl)alkanoate of Formula X. Another process for preparing compounds of Formula XV is the reaction of an anhydride of an α-(3-indolyl)alkanoic acid with glycerol, or a cyclic acetal thereof, to produce a compound of Formula XV, or an intermediate which, upon hydrolysis produces the desired compound. Another process for preparing compounds of Formula XV is that process wherein an acyl isourea is reacted with an α-(aza-3-indolyl)alkanoic acid to form a β,γ-alkylidenedioxypropyl ester of the α-(aza-3-indolyl)alkanoic acid which, upon hydrolysis, produces the desired compound. In effecting the foregoing procedures for preparing the compounds of Formula XV, the hereinabove described details of such reactions, as described for the preparation of compounds of Formula I, are, of course, applicable. It is also found that the alkylidenedioxypropyl esters of Formula XV also exhibit anti-inflammatory-analgesic activity.

One method for the preparation of the compounds of Formula XVI is depicted by the following reaction scheme, it being understood that although the 7-azaindoles are shown, that the process also embraces the preparation of the 4-aza-, 5-aza-, and 6-aza-indoles:

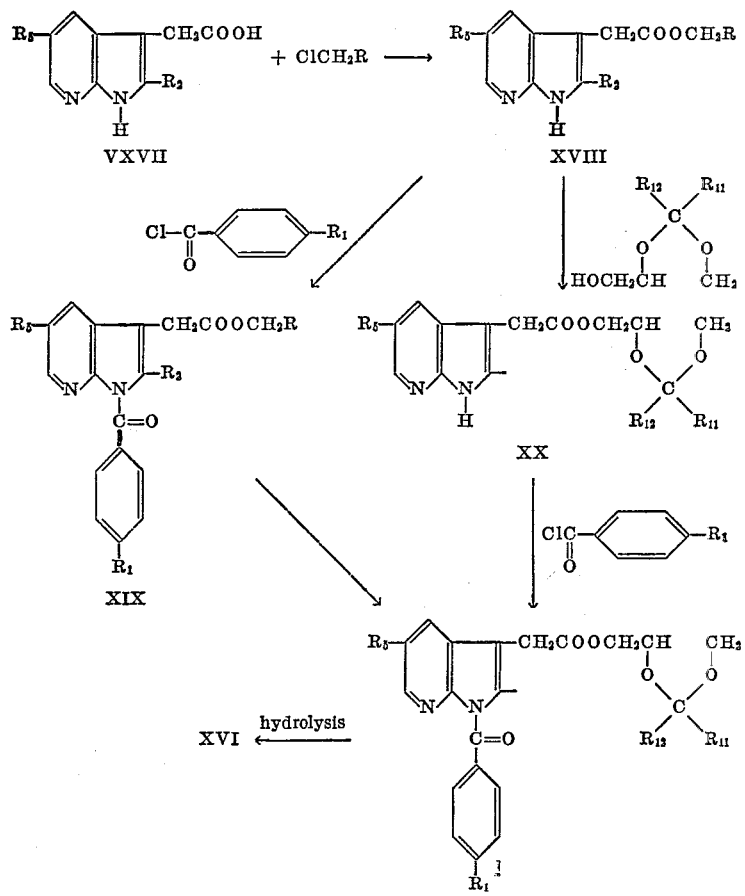

wherein R, $R_1$, $R_2$ and $R_5$ are as previously defined and $R_{11}$ and $R_{12}$ are lower alkyl. The required α-(1-aroyl-aza-3-indolyl)alkanoic acids and the α-(aza-3-indolyl)alkanoic acids may be prepared by the methods set forth in Netherlands Patent No. 6,510,648.

I claim:
1. A compound having the structural formula:

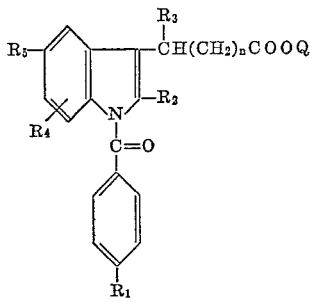

wherein $R_1$ is a member of the group consisting of hydrogen, halogeno, lower alkyl, trifluoromethyl, and -S-lower alkyl, $R_2$ is a member of the group consisting of hydrogen and lower alkyl, $R_3$ is a member of the group consisting of hydrogen and lower alkyl, $R_4$ is a member of the group consisting of hydrogen, lower alkoxy, halogeno, lower alkyl, and nitro, $R_5$ is a member of the group consisting of hydrogen, lower alkoxy, lower alkyl, trifluoromethyl, and diloweralkylamino, $n$ is 0, 1, 2, or 3 and Q is a member of the group consisting of

—CH₂CHOHCH₂OH and

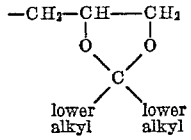

2. A compound of claim 1 wherein Q is

—CH₂CHOHCH₂OH $R_1$ is p-halogeno, $R_2$ is lower alkyl, $R_3$ and $R_4$ are hydrogen, $R_5$ is lower alkoxy, and $n$ is zero.

3. A compound of claim 2 wherein $R_1$ is p-chloro, $R_5$ is methoxy, said compound being glyceryl-α-(1-p-chlorobenzoyl-2-methyl-5-methoxy-3-indolyl)acetate.

4. A compound of claim 1 wherein Q is

—CH₂CHOHCH₂OH $R_1$ is -S-lower alkyl, $R_2$ is lower alkyl, $R_3$ and $R_4$ are hydrogen, $R_5$ is dialkylamino and $n$ is zero.

5. A compound of claim 4 wherein $R_1$ is methylthio, $R_2$ is methyl, $R_5$ is dimethylamino, said compound being glyceryl-α-(1 - p - methylthiobenzoyl-2-methyl-5-dimethylamino-3-indolyl)acetate.

6. A compound of claim 1 wherein $R_1$ is p-halogeno, $R_2$ is lower alkyl, $R_3$ and $R_4$ are hydrogen, $R_5$ is lower alkoxy, $n$ is zero, and Q is

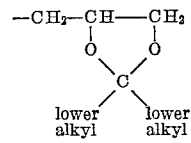

7. A compound of claim 6 wherein $R_1$ is p-chloro, $R_5$ is methoxy and Q is β,γ-isopropylidenedioxypropyl, said compound being β,γ-isopropylidenedioxypropyl-α-(1-p-chlorobenzoyl-2-methyl-5-methoxy-3-indolyl)acetate.

8. A compound of claim 1 wherein $R_1$ is -S-lower alkyl, $R_2$ is lower alkyl, $R_3$ and $R_4$ are hydrogen, $R_5$ is dialkylamino, $n$ is zero, and Q is

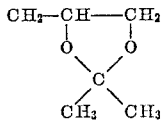

9. A compound of claim 8 wherein $R_1$ is p-methylthio, $R_2$ is methyl, $R_5$ is dimethylamino and Q is β,γ-isopropylidenedioxypropyl, said compound being β,γ-isopropylidenedioxypropyl-α-(1 - p - methylthiobenzoyl-2-methyl-5-methoxy-3-indolyl)acetate.

References Cited

UNITED STATES PATENTS 3,161,654   12/1964   Shen _____ 260—326.12

ALEX MAZEL, Primary Examiner

J. A. NARCAVAGE, Assistant Examiner

U.S. Cl. X.R.

260—295, 326.11, 326.13, 326.14; 424—263, 274